(12) United States Patent
Martin (10) Patent No.: US 9,446,509 B2
(45) Date of Patent: Sep. 20, 2016

(54) MOBILE TOOL CART AND STORAGE SYSTEM INCLUDING TOOL STORAGE DEVICES

(71) Applicant: Winfred Martin, Hamilton, OH (US)

(72) Inventor: Winfred Martin, Hamilton, OH (US)

(73) Assignees: Winfred Martin, Hamilton, OH (US); Nirvana Martin, Hamilton, OH (US)

(*) Notice: Subject to any disclaimer, the term of this patent is extended or adjusted under 35 U.S.C. 154(b) by 0 days.

(21) Appl. No.: 14/710,942

(22) Filed: May 13, 2015

(65) Prior Publication Data

US 2015/0328768 A1 Nov. 19, 2015

Related U.S. Application Data

(60) Provisional application No. 61/992,328, filed on May 13, 2014.

(51) Int. Cl.

| | |
|---|---|
| *B62B 3/00* | (2006.01) |
| *B25H 3/02* | (2006.01) |
| *B25H 3/00* | (2006.01) |
| *B62B 5/06* | (2006.01) |
| *B62B 3/02* | (2006.01) |
| *B25H 3/04* | (2006.01) |
| *B62B 3/14* | (2006.01) |
| *A47B 81/00* | (2006.01) |

(52) U.S. Cl.
CPC ............... *B25H 3/026* (2013.01); *A47B 81/00* (2013.01); *B25H 3/003* (2013.01); *B25H 3/04* (2013.01); *B62B 3/02* (2013.01); *B62B 3/14* (2013.01); *B62B 5/06* (2013.01)

(58) Field of Classification Search
CPC .......... B25H 3/003; B25H 1/02; B25H 3/00; B62B 3/10; B62B 1/10; B62B 3/00
See application file for complete search history.

(56) References Cited

U.S. PATENT DOCUMENTS

| 6,170,839 B1* | 1/2001 | Kizewski ................ B25H 3/00 280/47.19 |
|---|---|---|
| 7,213,822 B1* | 5/2007 | Webster .............. A61G 12/001 254/7 R |
| 7,571,915 B1* | 8/2009 | Simmons ................. B25H 3/00 280/47.26 |
| 8,162,330 B2* | 4/2012 | Melkumyan ............. B25H 1/02 280/47.34 |
| 8,328,013 B2* | 12/2012 | Stevens .................. B44D 3/123 206/373 |
| 8,550,477 B2* | 10/2013 | Bennett .................... B62B 3/10 280/47.34 |
| 8,915,504 B1* | 12/2014 | Seibert ..................... B62B 1/10 280/47.16 |
| 2010/0173394 A1* | 7/2010 | Colston, Jr. ........... B01F 3/0807 435/287.2 |
| 2011/0080077 A1* | 4/2011 | Lin ........................ A47B 97/00 312/270.3 |

* cited by examiner

*Primary Examiner* — Hau Phan
(74) *Attorney, Agent, or Firm* — Wood, Herron & Evans, LLP (57) ABSTRACT

A storage system includes a mobile tool cart having multiple shelves, each of which may be provided with tool storage devices, such as interconnected arrays of tubes that are sized to receive individual tools or pieces of equipment. The tubes in the tool storage devices may include tubes of varying diameter and/or length so as to accommodate different types of equipment needed at a worksite. The arrays of tubes are arranged on the shelves of a tool cart in any desirable configuration, and additional tool storage elements such as socket holders may also be placed on the shelves. The storage system also includes a storage housing configured to cover the tool cart and prevent unauthorized access to the equipment and tools during periods of non-use.

16 Claims, 8 Drawing Sheets

MOBILE TOOL CART AND STORAGE SYSTEM INCLUDING TOOL STORAGE DEVICES

CROSS REFERENCE TO RELATED APPLICATIONS

This application claims the benefit of U.S. Provisional Patent Application Ser. No. 61/992,328 filed on May 13, 2014, the disclosure of which is incorporated by reference herein in its entirety.

TECHNICAL FIELD

The present invention generally relates to storage systems and devices configured to retain tools or a set of supplies and, more particularly, to storage systems including a mobile cart.

BACKGROUND

Many storage system designs are known for holding various items, such as various types of tools used in fields such as automotive repair and lawn care. For example, a typical tool cart (or toolbox on wheels) includes a plurality of drawers or shelves upon which tools may be positioned for access at the worksite. Generally these separate drawers can be used to organize sets of tools, such as screwdrivers in one drawer and wrenches in another. However, the tools are typically placed horizontally next to one another within these drawers, and that can lead to a mixing together of tools and disorganization when the drawers are opened and closed, or even when the tool cart is moved around the worksite. As a result, even a well-organized conventional tool cart will eventually become disorganized, which increases the time needed to find a specific tool and the associated frustration for users of the tool cart.

Conventional storage system manufacturers have tried to address these concerns by adding additional fixed structures such as divider walls and compartment inserts within the drawers or shelves of a tool cart. However, these fixed structures limit the size and shape of elements that can be stored in particular locations, which leads to additional frustration because each user tends to develop a different organization style to help locate specific tools most efficiently when needed at the worksite. Furthermore, each user will typically have a unique set of equipment or tools that needs to be on hand while working, and the size and shape of this equipment may vary dramatically in different fields or for different users. Thus, the additional structures added to help organize the conventional tool carts have not provided a suitable solution for use across multiple fields of work endeavors.

Accordingly, there remains a need in the art for a tool cart and a related storage system that overcomes the disadvantages with conventional storage systems identified above.

SUMMARY

In accordance with an embodiment of the present invention, a tool storage device includes an array of tubes open at least one end thereof. The tubes are interconnected to each other such that each of the tubes is oriented generally vertically and operatively connected at an external surface thereof to at least one other tube in the array of tubes. At least one of the tubes in the array of tubes defines at least one of a different diameter or length than other tubes in the array of tubes. In addition, each of the tubes defines at elongated hollow storage space configured to receive a working device, such as a tool or piece of equipment, for ready access by a user.

According to another embodiment of the present invention, a mobile tool cart includes a frame mounted on at least one of a plurality of wheels and plurality of feet, a plurality of shelves coupled to and supported by the frame, and at least two tool storage devices. The at least two tool storage devices are positioned on the plurality of shelves in such a manner so as to be reconfigurable in arrangement on the shelves. Each of the tool storage devices further includes an array of tubes open at least one end thereof. The tubes are interconnected to each other such that each of the tubes is oriented generally vertically and operatively connected at an external surface thereof to an least one other tube in the array of tubes. At least one of the tubes in the array of tubes defines at least one of a different diameter or length than other tubes in the array of tubes. In addition, each of the tubes defines at elongated hollow storage space configured to receive a working device for ready access by a user.

According to yet another embodiment of the present invention, a tool storage system includes a storage housing and a mobile tool cart. The storage housing includes at least one storage space accessible through a door and a lock mechanism associated with the door to prevent unauthorized access in the storage housing. The mobile tool cart includes a frame mounted on at least one of a plurality of wheels and plurality of feet, a plurality of shelves coupled to and supported by the frame, and at least two tool storage devices. The at least two tool storage devices are positioned on the plurality of shelves in such a manner so as to be reconfigurable in arrangement on the shelves. Each of the tool storage devices further includes an array of tubes open at each end thereof. The tubes are interconnected to each other such that each of the tubes is oriented generally vertically and operatively connected at an external surface thereof to an least one other tube in the array of tubes. At least one of the tubes in the array of tubes defines at least one of a different diameter or length than other tubes in the array of tubes. In addition, each of the tubes defines at elongated hollow storage space configured to receive a working device for ready access by a user.

The present invention overcomes the foregoing and other shortcomings and drawbacks of containers heretofore known. While the invention will be described in connection with exemplary embodiments, it will be understood that the invention is not limited to these embodiments. On the contrary, the invention includes all alternatives, modifications and equivalents as may be included within the spirit and scope of the present invention.

BRIEF DESCRIPTION OF THE DRAWINGS

The accompanying drawings, which are incorporated in and constitute a part of this specification, illustrate embodiments of the invention and, together with the detailed description given below, serve to explain the principles of the present invention.

It should be understood that the appended drawings are not necessarily to scale, presenting a somewhat simplified representation of various preferred features illustrative of the basic principles of the present invention. The specific design features of the containers as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION

Figure 1:
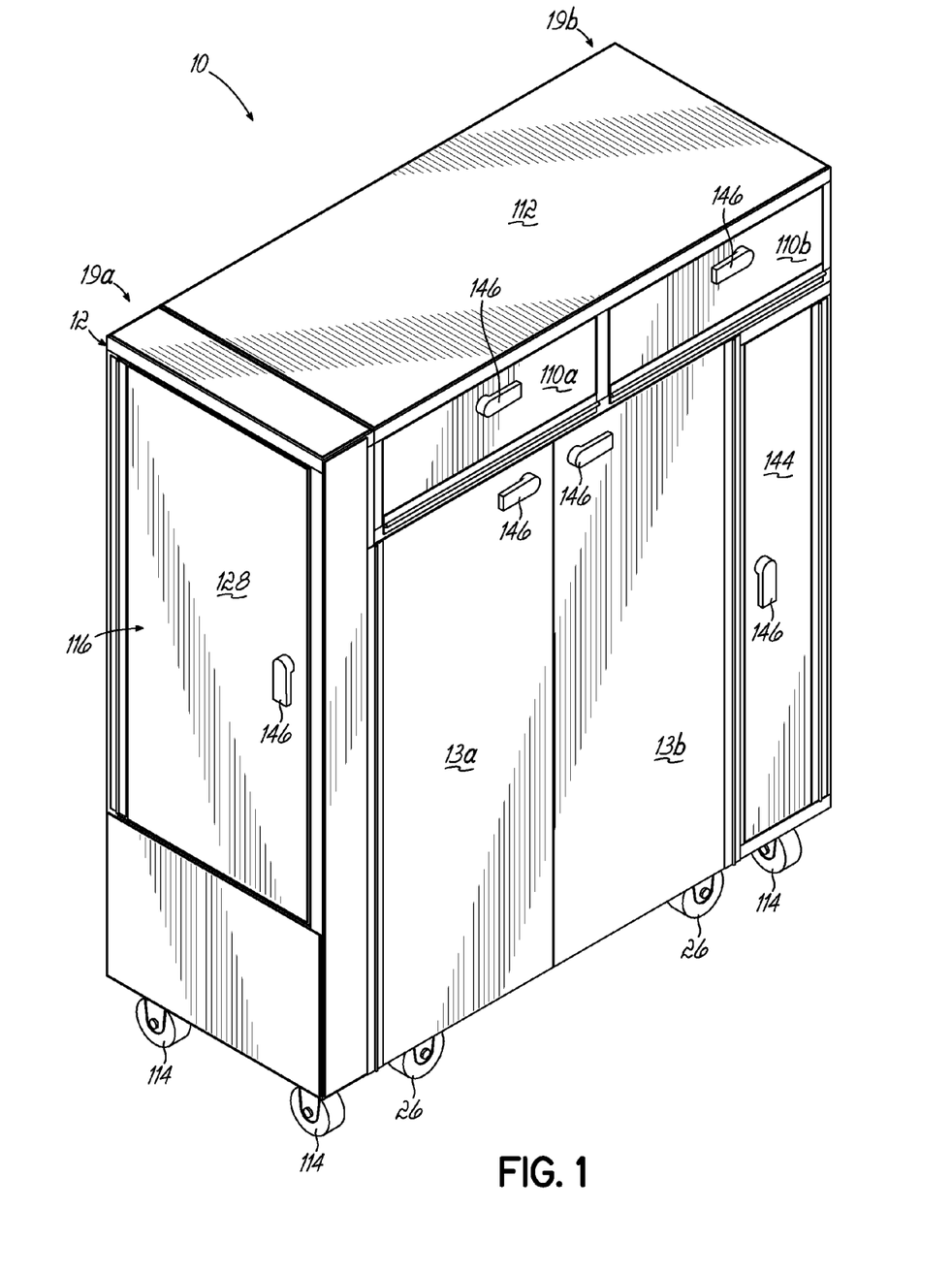
FIG. 1 is a perspective view of a storage system in accordance with an embodiment of the present invention described herein.
Figure 2A:
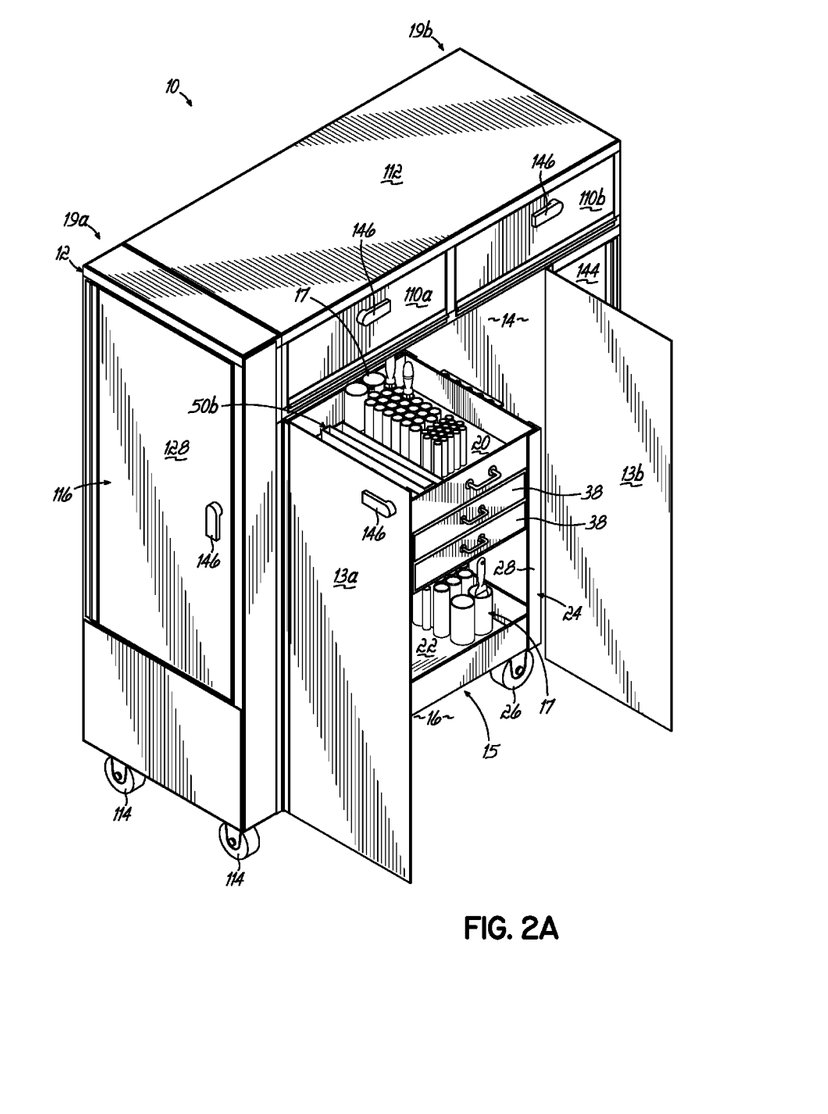
FIG. 2A is a perspective view of the storage system similar to FIG. 1, but with a pair of central doors in an open position for accessing a mobile tool cart therein.

With reference to FIG. 1 and FIG. 2A, a storage system 10 is shown in accordance with an embodiment of the present invention. The storage system 10 includes an enclosed storage housing 12 defining one or more storage spaces that may be accessible through doors provided in the storage housing 12 and discussed below in additional detail. The storage housing 12 may also be referred to as a "storage garage." FIG. 1 shows a pair of central doors 13a, 13b in a closed position covering a central storage space 14 (see FIG. 2A) to inhibit unauthorized access therethrough. In contrast, FIG. 2A shows the central doors 13a, 13b in an open position for accessing a mobile tool cart 15 within the central storage space 14. The central storage space 14 extends toward an open bottom portion 16 of the storage housing 12 and, as such, receives the mobile tool cart 15 therethrough for storage. As described in further detail below, the mobile tool cart 15 supports a plurality of tool storage devices 17 positioned thereon so as to be reconfigurable in one or more arrangements to fit the needs and preferences of a user. The tool storage devices 17 are more particularly defined by an array of tubes 18a, 18b, 18c, 18d, 18e, 18f, 18g, 18h, 18i, 18j (see FIGS. 2C-2D), interconnected to one another and oriented generally vertically on the tool cart 15. The array of tubes 18a, 18b, 18c, 18d, 18e, 18f, 18g, 18h, 18i, 18j (see FIGS. 2C-2D) includes hollow tubes that vary in diameter and/or length in each of the tool storage devices 17, so that the tubes are sized and configured to receive working devices, such as tools and pieces of equipment, having various sizes and shapes. Each of the tubes is configured to receive one or a small subset of tools to hold and maintain the organization of the tools to enable a user to quickly locate and find a specific tool amongst the entire set of tools. Consequently, the replaceable and reconfigurable tool storage devices 17 advantageously improve organization and accessibility of items stored on the tool cart 15 and in the storage system 10.

As will be readily understood, the central storage space 14 is sized to be slightly larger than the tool cart 15 so that any tools or pieces of equipment stored on the tool cart 15 will fit within the storage housing 12 when the tool cart 15 is to be stored between periods of use. Of course, the specific size and shape of the storage housing 12 and of the tool cart 15 may be modified to be larger or smaller in other embodiments without departing from the scope of the invention. Thus, the tool cart 15 may be reconfigured to be used for various fields of endeavor where different pluralities of supplies, tools, equipment, or other working devices need to be accessible at a worksite. In addition, the central storage space 14 is positioned between a left end portion 19a and a right end portion 19b of the storage housing 12, as described with respect to the exemplary embodiment of the storage system 10. However, it will be appreciated that the central storage space 14, and any other storage spaces, may be alternatively positioned. It will be appreciated that the terms "left" and "right" are relative terms of position with respect to the storage system 10 shown in FIG. 1 and, as such, are not necessarily intended to limit the invention.

Figure 2B:
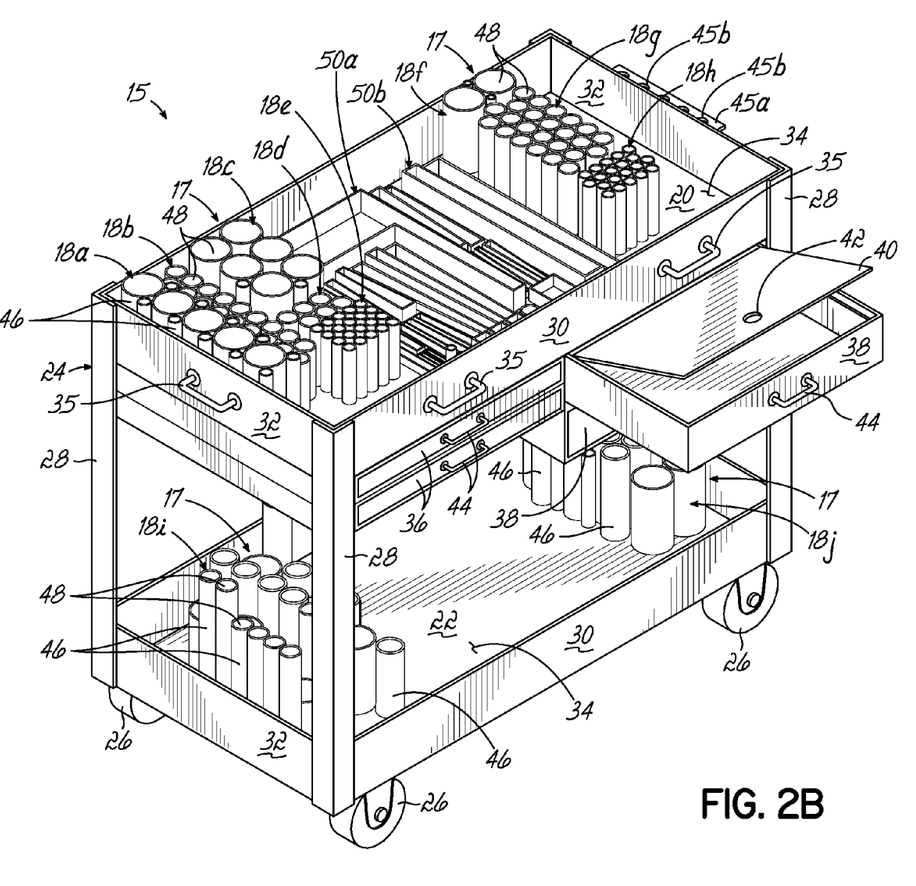
FIG. 2B is a perspective view of the mobile tool cart shown in FIG. 2A.

With respect to FIG. 2A and FIG. 2B, the tool cart 15 may be used to hold a variety of working devices, such as tools and equipment, for example tools and equipment used in automotive construction and repair. In order to support each array of tubes 18a, 18b, 18c, 18d, 18e, 18f, 18g, 18h, 18i, 18j and the tools held therein, the tool cart 15 includes a horizontal upper shelf 20 offset from a horizontal lower shelf 22. A cart frame 24 rigidly extends between the top and bottom shelves 20, 22 and provides structural support to the top and bottom shelves 20, 22. In addition, the tool cart 15 is advantageously made mobile by mounting the cart frame 24 upon a plurality of wheels 26. In the exemplary embodiment, the wheels 26 mount directly to the bottom shelf 22; however, it will be appreciated that the wheels 26 may alternatively be mounted directly on the cart frame 24 in other embodiments. The wheels 26 enable easy movement of the tool cart 15 to different locations at a worksite, such as along different locations near a vehicle being worked on by the user. In embodiments of the storage system 10 including a stationary storage housing 12, the wheels 26 also enable movement of the tool cart 15 to and from the storage housing 12 for storage, such as at the end of a workday within a repair shop.

Alternatively, the tool cart 15 may include a plurality of feet (not shown) or other similar supports instead of, or in combination with the wheels 26. In worksite settings where the tool cart 15 may be maintained in a relatively stationary position, the feet (not shown) may be sufficient while still enabling some level of mobility when required. To this end, the feet (not shown) may be provided with a low-friction coating or material to enable this movement of the tool cart 15 in such embodiments. Regardless of the specific support for the tool cart 15, the cart frame 24 and the plurality of shelves 20, 22 are positioned relatively close to the worksite so that the user may quickly access the tools and equipment stored on the tool cart 15.

The top and bottom shelves 20, 22 connect to the cart frame 24, which includes a plurality of corner posts 28 in each corner of the generally rectangular tool cart 15. Each of the top and bottom shelves 20, 22 is tray-shaped and therefore includes a series of sidewalls 30, 32 extending upwardly from a primary horizontal shelf surface 34. The top and bottom shelves 20, 22 connect to the cart frame 24 using fasteners (not shown) extending through the corner posts 28 and into the sidewalls 30, 32 of the shelves 20, 22. The sidewalls 30, 32 of the top shelf 20 also have a plurality of cart handles 35 that may be gripped by the user for the user to more easily direct movement of the tool cart 15. According to the exemplary embodiment, the tool cart 15 is formed from metal. However, it will be appreciated that the entire structure defining the tool cart 15 may be manufactured from other materials in alternative embodiments configured to support the tools and equipment thereon. For example, the tool cart 15 may be manufactured from metal, wood, or any combination thereof.

The tool cart 15 further includes a plurality of cart drawers 36, 38 positioned below and adjacent to the top shelf 20 for additional tool storage. More particularly, a left half of the tool cart 15 includes a pair of stacked drawers 36 for storing any tools as desirable by the user. In addition, a right half of the tool cart 15 includes a pair of extended cart drawers 38 for similar storage. The extended cart drawer 38 also includes a work plate 40 movable between an open and a closed position. In the closed position, the work plate 40 is generally horizontal and provides an additional work surface for the user to lay tools and equipment during use. To access additional tools and equipment stored within the extended cart drawer 38, the user pivots the work plate 40 toward the open position by pulling upward on the work plate 40 via the aperture 42. According to an alternative embodiment, the work plate 40 may simply rest within the extended cart drawer 38 and/or be completely removed therefrom. The work plate 40 could also be separately mounted for sliding engagement relative to the tool cart 15 in alternative embodiments (e.g., a slidable, table-like surface). As such, the invention is not intended to be limited to the extended cart drawer 38 and the work plate 40 described herein. Each of the cart drawers 36, 38 also includes a drawer handle 44 to provide the user with a convenient structure by which to grip and pull the drawers 36, 38.

The tool cart 15 also includes an auxiliary tool holding plate 45a coupled to the sidewall 32 of the top shelf 18. The tool holding plate 45a extends away from the sidewall 32 and includes various apertures 45b configured to receive portions of elongate tools such as screwdrivers and pry bars. As described above, the tool holding plate 45a adds to the storage capacity of the tool cart 15 while also providing a location to store longer items that may not fit easily on the top and bottom shelves 20, 22 and in the tool storage devices 17. One or more additional tool holding plates or similar items such as pegboards (not shown) may be added to the sidewalls 30, 32 of the tool cart 15 in other embodiments.

With respect to FIG. 2B, the tool storage device 17 includes a plurality of tubes interconnected together to form an array of tubes 18a, 18b, 18c, 18d, 18e, 18f, 18g, 18h, 18i, 18j. As shown in FIG. 2B, the tubes are generally indicated by reference numeral 46 and generally define respective elongated hollow storage spaces 48. Many of the tubes 46 in the tool storage devices 17 are configured to receive a single working device (e.g., a tool or piece of equipment) within the elongated hollow storage space 48 defined therein. However, a small subset of similar tools, for example the set of similarly-sized wrenches, may also be positioned in any single tube depending on the preferences of the end user. The tubes 46 are disposed generally vertically so that the tools and pieces of equipment are stored in an upright position, and this orientation enables quick identification and access of tools by the user when the user needs to retrieve one or more items from the tool cart 15. Furthermore, the vertical orientation of the tubes 46 enables a great number of tools to be stored and viewed simultaneously on each of the shelves 20, 22, thereby increasing the space-efficiency and organizational effectiveness on the tool cart 15. To this end, the user of the tool cart 15 may quickly identify a storage location of a desired tool and then retrieve the tool immediately when needed at the worksite.

FIG. 2B illustrates a series of "building block" portions that may be combined by fastening together to form the arrays of tubes 18a, 18b, 18c, 18d, 18e, 18f, 18g, 18h, 18i, 18j (see FIG. 2C and FIG. 2D) defining the tool storage devices 17 positioned on the top and bottom shelves 20, 22 of the tool cart 15. Each of the arrays of tubes 18a, 18b, 18c, 18d, 18e, 18f, 18g, 18h, 18i, 18j (see FIG. 2C and FIG. 2D) generally have tubes 46 of a similar elongate length (ranging from approximately 3" to approximately 7"), with tubes 46 of varying diameters connected together in some group of tubes 46. As shown in the exemplary groups or "building blocks," the tubes 46 may be coupled, such as directly coupled, to one another along external surfaces thereof to at least one adjacent tube, and preferably each tube 46 is operatively connected along an external surface thereof to at least two adjacent tubes 46. As a result, the tubes 46 are generally tightly packed within the tool storage devices 17 to maximize the storage space utilized for storing tools and equipment. In other non-illustrated embodiments, the external surfaces of adjacent tubes 46 could be connected using other known arrangements, including connecting members extending between the tubes 46.

It will be understood that the tubes 46 may be coupled to one another using various methods, including coupling with an adhesive, a weld or other coupling method well known in the art. Alternatively, the tubes 46 may be integrally molded together, depending on the materials used to construct the tubes. The groups or "building blocks" containing multiple tubes 46 are then connected to one another to form the overall tool storage devices 17 discussed herein. The specific variation and mix of tube lengths and diameters used in an array defining the tool storage device 17 can therefore be varied to fit the needs of the user, and the following description of exemplary embodiments of the tool storage devices 17 is therefore not intended to be limiting the scope of the claimed invention.

Figure 2C:
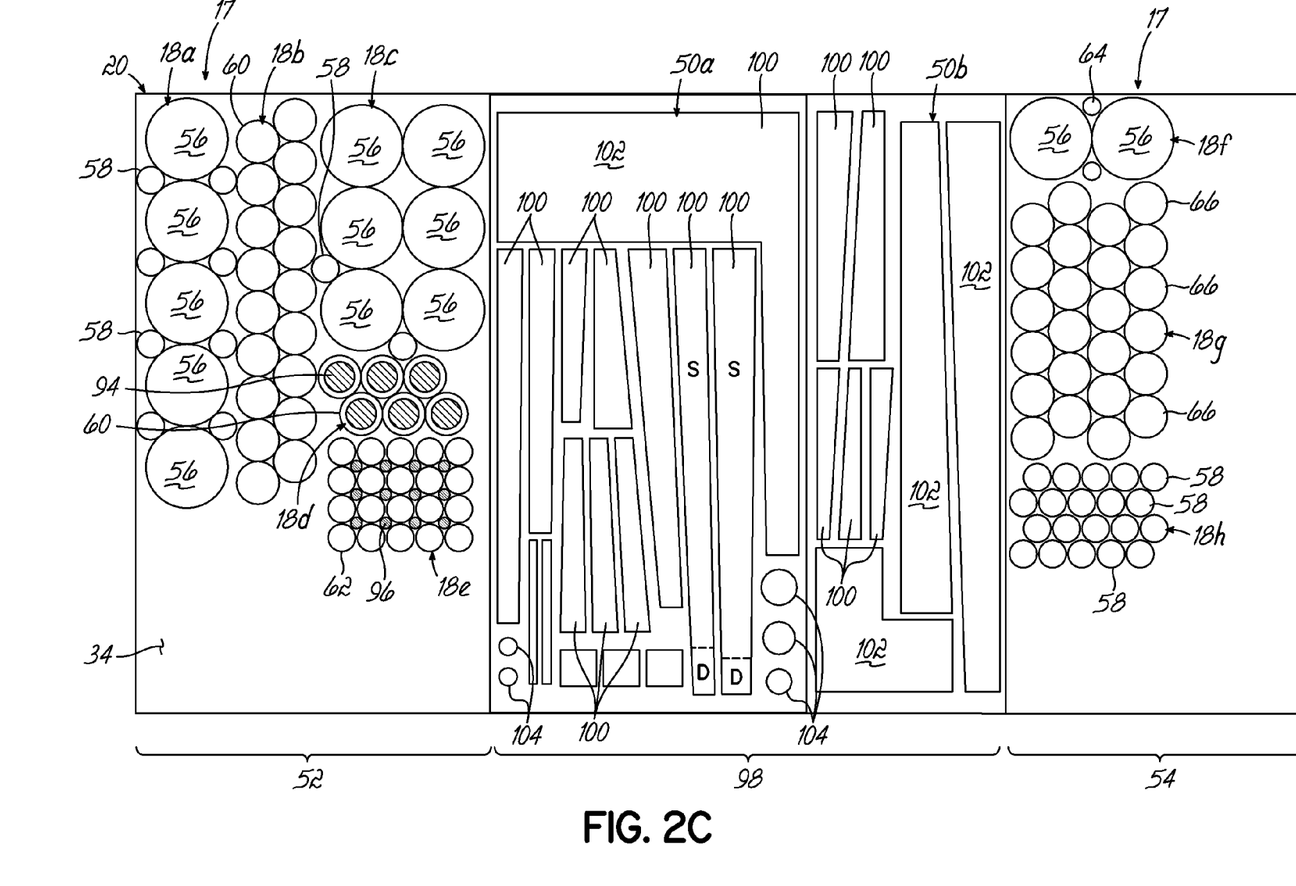
FIG. 2C is a schematic plan view of a top shelf of an exemplary embodiment of a mobile tool cart having a plurality of tool storage devices according to the present invention described herein.
Figure 2D:
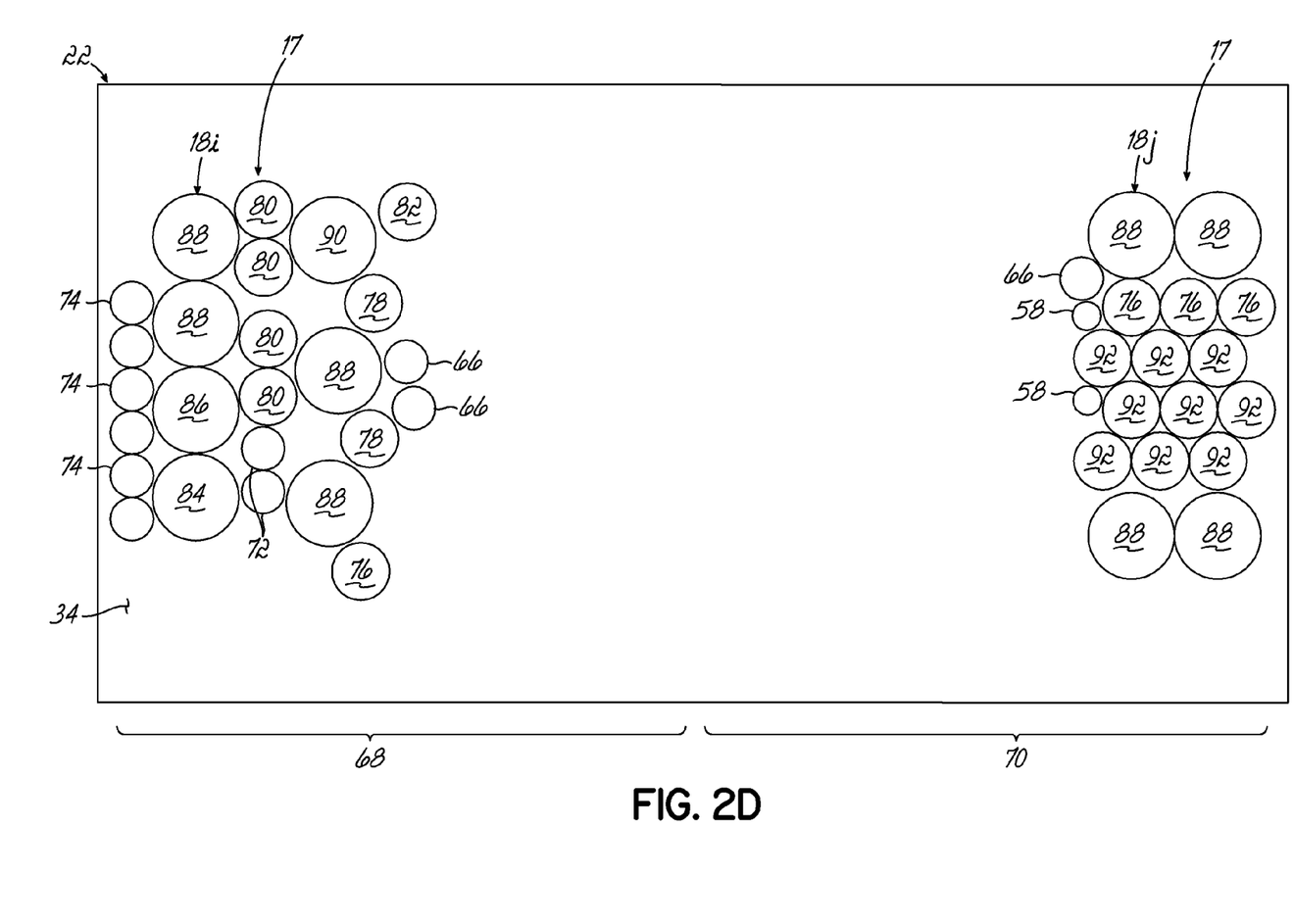
FIG. 2D is a schematic plan view of a bottom shelf of an exemplary embodiment of a mobile tool cart having a plurality of tool storage devices according to the present invention described herein.

FIG. 2C and FIG. 2D show exemplary embodiments of each of the arrays of tubes 18a, 18b, 18c, 18d, 18e, 18f, 18g, 18h, 18i, 18j as well as a pair of socket arrangements 50a, 50b. With respect to FIG. 2C, a left portion 52 of the top shelf 20 supports five tube arrays 18a, 18b, 18c, 18d, 18e, whereas a right portion 54 of the top shelf 20 supports three tube arrays 18f, 18g, 18h. According to the exemplary embodiment, the first array of tubes 18a includes five tubes 56 and eight tubes 58 having generally equivalent heights, but different diameters. The second array of tubes 18b includes eighteen tubes 60 of generally equivalent heights and generally equivalent diameters. The third array of tubes 18c includes six tubes 56 and two tubes 58 having generally equivalent heights, but different diameters. The fourth array of tubes 18d includes six tubes 60 of generally equivalent heights and generally equivalent diameters. The fifth array of tubes 18e includes twenty tubes 62 of generally equivalent heights and generally equivalent diameters. With respect to the right portion 54 of the top shelf 20, the sixth array of tubes 18f includes two tubes 64 and two tubes 56 of generally equivalent heights, but different diameters. The seventh array of tubes 18g includes twenty-four tubes 66 of generally equivalent heights and generally equivalent diameters. The eighth array of tubes 18*h* includes twenty tubes 58 of generally equivalent heights and generally equivalent diameters.

With respect to FIG. 2D, a left portion 68 of the bottom shelf 22 includes the array of tubes 18*i*, whereas a right portion 70 of the bottom shelf 22 include the array of tubes 18*j*. According to the exemplary embodiment, the ninth array of tubes 18*i* includes two tubes 66, two tubes 72, six tubes 74, one tube 76, two tubes 78, four tubes 80, one tube 82, one tube 84, one tube 86, four tubes 88, and one tube 90 of different heights and different diameters. The tenth array of tubes 18*j* includes two tubes 58, one tube 66, three tubes 76, nine tubes 92, and four tubes 88 of different heights and different diameters.

Furthermore, as shown in FIG. 2C and FIG. 2D, each of the tubes 56, 58, 60, 62, 64, 66, 72, 74, 76, 80, 82, 84, 86, 88, 90, 92 is formed from sixteen gage rolled plate having open tops and bottoms defining the hollow storage spaces 48 therebetween. The tubes 56, 58, 60, 62, 64, 66, 72, 74, 76, 80, 82, 84, 86, 88, 90, 92 within each of the respective arrays 18*a*, 18*b*, 18*c*, 18*d*, 18*e*, 18*f*, 18*g*, 18*h*, 18*i*, 18*j* are each spot welded together to secure each of the arrays 18*a*, 18*b*, 18*c*, 18*d*, 18*e*, 18*f*, 18*g*, 18*h*, 18*i*, 18*j* as a unitary structure. Each array of tubes 18*a*, 18*b*, 18*c*, 18*d*, 18*e*, 18*f*, 18*g*, 18*h*, 18*i*, 18*j* generally sits atop its respective top and bottom shelf 20, 22; however, it will be appreciated that one or more of the array of tubes 18*a*, 18*b*, 18*c*, 18*d*, 18*e*, 18*f*, 18*g*, 18*h*, 18*i*, 18*j* may alternatively be fixedly secured in position on its respective shelf 20, 22. It will be appreciated that the size and pattern of the tubes 56, 58, 60, 62, 64, 66, 72, 74, 76, 80, 82, 84, 86, 88, 90, 92 and arrays 18*a*, 18*b*, 18*c*, 18*d*, 18*e*, 18*f*, 18*g*, 18*h*, 18*i*, 18*j* may vary in accordance with the invention described herein. However, by way of example, the tubes 56, 58, 60, 62, 64, 66, 72, 74, 76, 80, 82, 84, 86, 88, 90, 92 shown in FIG. 2C and FIG. 2D are sized as follows:

TABLE 1

Exemplary Tube Dimensions

| Tube | Diameter | Height |
|---|---|---|
| tube 56 | 3" | 5" |
| tube 58 | 1" | 5" |
| tube 60 | 1.5" | 4" |
| tube 62 | 1" | 4" |
| tube 64 | 0.5" | 5" |
| tube 66 | 1.5" | 5" |
| tube 72 | 1.5" | 8" |
| tube 74 | 1.5" | 10" |
| tube 76 | 2" | 5" |
| tube 78 | 2" | 6" |
| tube 80 | 2" | 8" |
| tube 82 | 2" | 10" |
| tube 84 | 3" | 3" |
| tube 86 | 3" | 4" |
| tube 88 | 3" | 5" |
| tube 90 | 3" | 6" |
| tube 92 | 2" | 7" |

In addition, each array of tubes 18*d*, 18*e* includes removable foam spacers 94, 96 therein to adjust a depth of the arrays of tubes 18*d*, 18*e*. More particularly, the array of tubes 18*d* receives the foam spacers 94 within the hollows of the tubes 60, whereas the array of tubes 18*e* receives the foam spacers 96 within the interstitial space between the tubes 62. Although these spacers 94, 96 are formed from a foam material and are moveable in the exemplary embodiment, the spacers 94, 96 could be integrally formed with other tubes or formed from a different material in other embodiments, and the spacers 94, 96 could be fixed at a certain depth as well in other embodiments.

The socket arrangements 50*a*, 50*b* are positioned in a central portion 98 of the top shelf 20 between the left and right portions 52, 54. Each of the socket arrangements 50*a*, 50*b* include a plurality of socket trays 100 configured to hold sockets and other bits for access by the user. The socket arrangements 50*a*, 50*b* also serve additional purposes. For example, the socket arrangements 50*a*, 50*b* space apart the arrays of tubes 18*a*, 18*b*, 18*c*, 18*d*, 18*e*, 18*f*, 18*g*, 18*h*, 18*i*, 18*j* so as to provide different distinct groupings of storage locations, such as for different types of tools and equipment that may be stored. The position of the socket arrangements 50*a*, 50*b* adjacent to the arrays of tubes 18*a*, 18*b*, 18*c*, 18*d*, 18*e*, 18*f*, 18*g*, 18*h*, 18*i*, 18*j* also positions the sockets and bits in close relation to the tools used in conjunction with those elements within close reach of the user. The socket trays 100 are typically manufactured from a plastic material to limit weight and manufacturing costs, but may be manufactured from alternative materials capable of holding the tools and bits. Furthermore, the socket trays 100 are configured to be moved around with the tool storage devices 17 to any possible arrangement or configuration on the top and bottom shelves 20, 22 of the tool cart 15 according to the needs and preferences of the specific end user of the tool cart 15. As such, the socket arrangements 50*a*, 50*b* shown in FIG. 2C are just one example. Indeed, the socket trays 100 may be increased or decreased in size or omitted altogether in some embodiments consistent with the scope of the invention.

Each of the socket trays 100 is provided with an elongate channel 102 configured to receive a set of similar socket heads, such as a metric set in one channel 102 and an English-dimension set in another channel 102. However, the user may determine a desirable organization for the sockets and bits stored within the socket trays 100. Alternatively or in addition to the elongated channels 102, the socket trays 100 may includes a series of cylindrical bores 104 configured to receive individual sockets or bits as well. As with the arrays of tubes 18*a*, 18*b*, 18*c*, 18*d*, 18*e*, 18*f*, 18*g*, 18*i*, 18*j* of the tool storage devices 17, the specific layout and type of channels and bores may be modified in the socket trays 100 to fit the needs of the end user. For example, the sockets trays 100 and elongated channels 102 may have a variety of depths to accommodate particular sockets. By way of further example, the socket trays 100 define a total depth of about 3.5", although the specific channels and bores provided may have differing depths for differently-sized socket sets and bits (indicated by the indicators shallow "S" and deep "D" for example in FIG. 2C).

According to another exemplary embodiment, the socket trays 100 may further include an outwardly directed edge handle (not shown) that assists with moving or holding the socket tray 100 when not positioned in the tool cart 15. These edge handles (not shown) may also rest on top of the sidewalls 30, 32 of the top shelf 20 when the socket trays 100 are placed on the top shelf 18, thereby helping maintain the socket trays 100 in a desired position. Moreover, a bottom of the socket trays 100 may include magnetic strips (not shown) to help hold sockets in position, especially when one or more sockets have been removed from the channel 102 for use. The magnetic strips also help avoid accidental dislodging of multiple sockets and encourage improved organization of the tool cart 15 while moving the tool cart 15. The combination and adjustable arrangement of the socket trays 100 and the tool storage devices 17 help provide a nearly unlimited number of distinctive and desirable storage locations and layouts for the types of tools and equipment used in various fields of worksite endeavors.

With respect to FIGS. 1 and 3-4C, the exemplary storage system 10 includes additional features for storing and organizing tools and equipment. FIG. 1 shows a pair of side-by-side housing drawers 110a, 110b positioned below a top housing surface 112 and generally above the central storage space 14. The top housing surface 112 provides a relatively flat and horizontal surface on which the user may store tools and equipment during use. The storage housing 12 further includes a plurality of housing wheels 114 for improved mobility of the storage system 10. For example, the storage housing 12 and the mobile tool cart 15 (see FIG. 2) stored therein may be rolled simultaneously from one worksite to another worksite as discussed above. More particularly, the housing wheels 114 are 5" diameter, hard rubber caster wheels 114. However, it will be appreciated that different types of wheels, feet, or rollers may be provided as briefly described above. The housing wheels 114 shown in FIG. 1 are convenient for rolling around and over items and obstacles (e.g., cords, etc.) that may be typically found around a worksite such as an automotive shop.

The housing drawers 110a, 110b define a pair of drawer storage spaces (not shown) to provide additional storage space for tools and equipment. In addition, the left end portion 19a of the storage housing 12 includes a storage box 116, and the right end portion 19b of the storage housing 12 includes a plurality of built-in storage drawers 118, 120, 122, 124. As shown more particularly in FIG. 3, the storage box 116 on the left end portion 19a of the storage housing 12 defines a tall, elongate storage space 126 for holding items, such as brooms and long-handled mechanisms. The storage housing 12 further includes a hinged cabinet door 128 movable between a closed position, which covers the elongate storage space 126, and an open position for accessing the elongate storage space 126.

Figure 3:
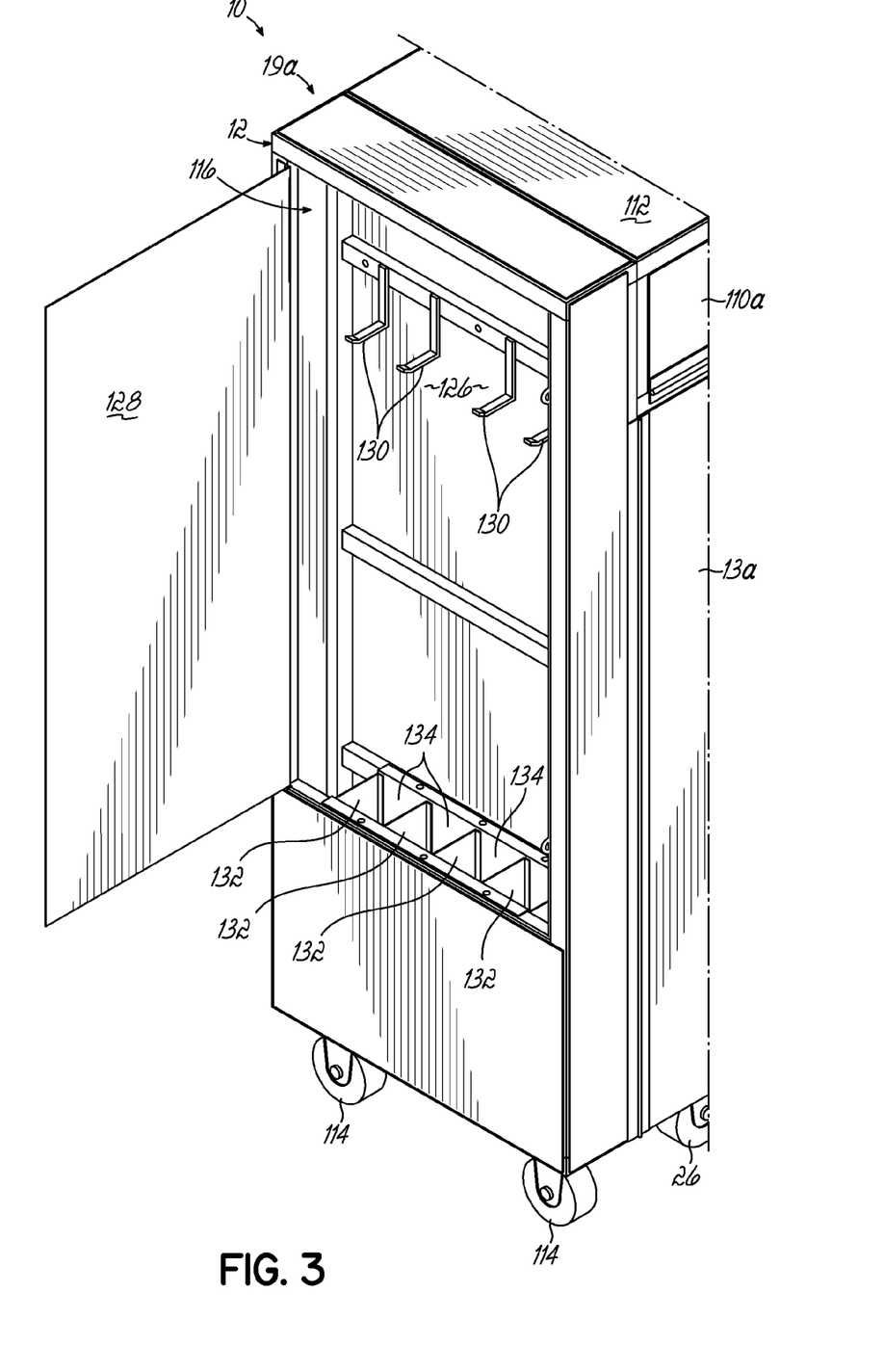
FIG. 3 is an enlarged perspective view of the storage system similar to of FIG. 1, but with a cabinet door in an open position for accessing a storage box of the storage system.

According to the exemplary embodiment shown in FIG. 3, the storage box 116 is vertically oriented and contains a plurality of hooks 130 mounted therein to hold additional elongate tools or handles with hanging apertures. Below the hooks 130, a plurality of vertical walls 132 defines a plurality of vertically oriented receptacles 134, which are configured to receive additional tools and equipment for storage within the storage box 116. For example, the storage box 116 may contain a power strip (not shown) mounted therein for electrically connecting to a power source (not shown). As such, batteries and other electrically-charged items may be stored in the storage box 116 so that ready access is provided to the integrated power strip. Of course, it will be understood that power strips may be provided alternatively in one or more of the other storage spaces discussed herein.

Figure 4A:
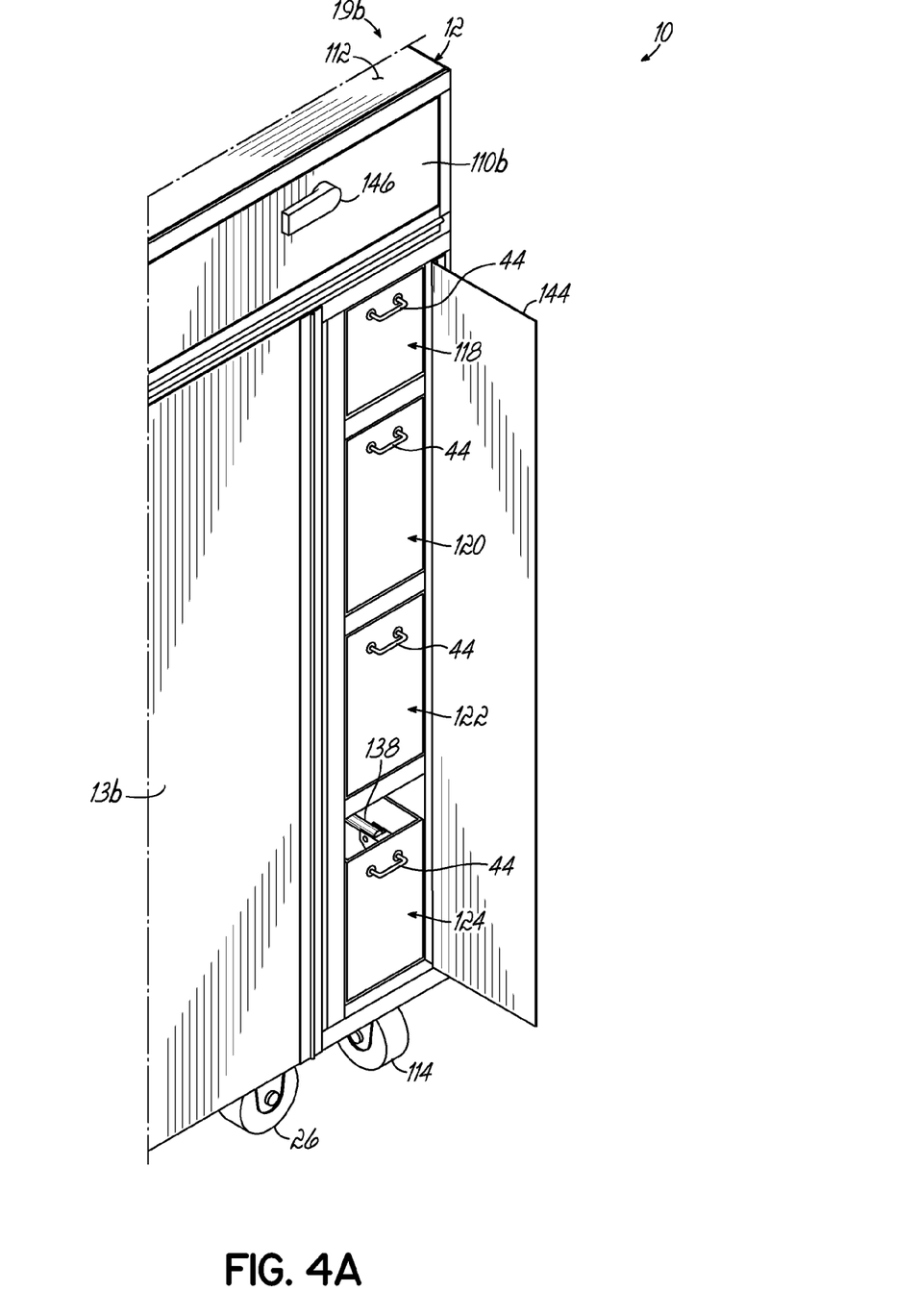
FIG. 4A is an enlarged perspective view of the storage system similar to of FIG. 1, but with a cabinet door in an open position for accessing a plurality of storage drawers.
Figure 4B:
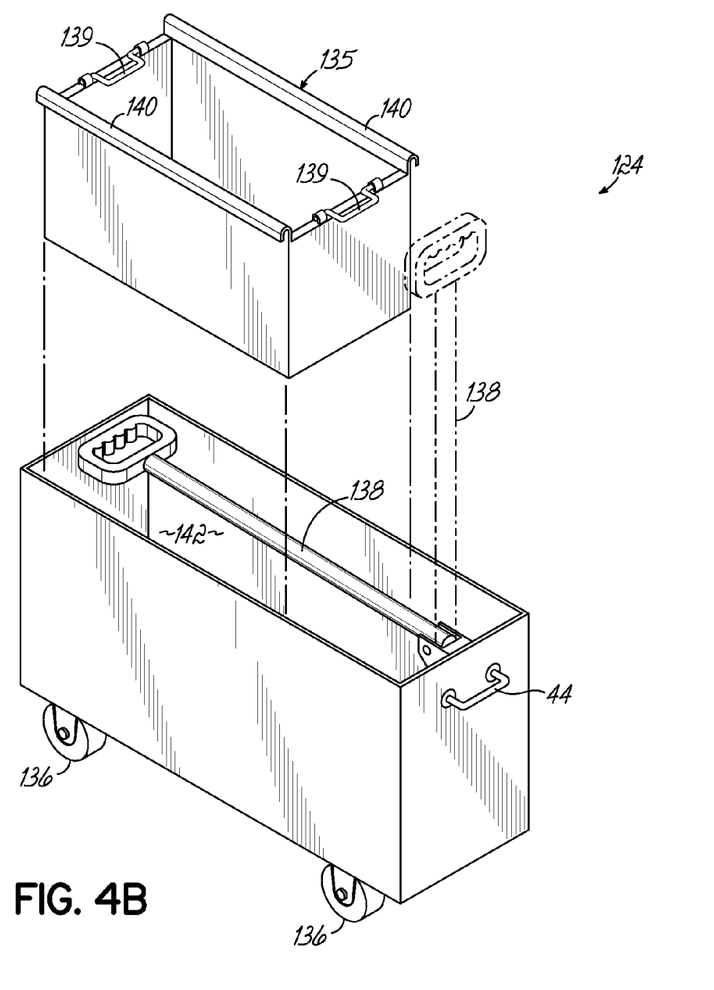
FIG. 4B is a partially exploded perspective view of the storage drawer of FIG. 4A, which is in the form of a wagon cart.
Figure 4C:
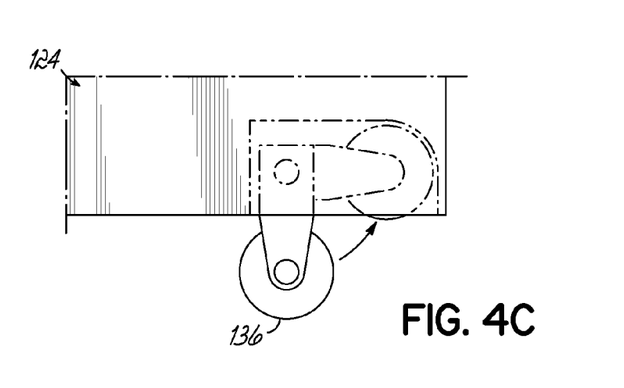
FIG. 4C is an enlarged side view of a gurney wheel of the wagon cart shown in FIG. 4B.

With respect to FIGS. 4A-4C, the right end portion 19b of the storage housing 12 includes the plurality of storage drawers 118, 120, 122, 124. According to the exemplary embodiment, the storage drawers 118, 120, 122, 124 vertically align and are configured to slide horizontally out from the storage housing 12 for accessing the storage space (not shown) therein. While the storage drawers 118, 120, 122 are configured as a typical drawer, the storage drawer 124 is in the form of a wagon cart 124 containing a suspended tray 135 and including a plurality of gurney wheels 136 and a fold-down handle 138. The suspended tray 135 includes a pair of opposing lips 140, which rest on the edges of the wagon cart 124 to suspend the tray 135 within a cart storage space 142 of the wagon cart 124. The tray 135 also includes opposing, foldable handles 139 by which the user may grip and lift the tray 135 from the wagon cart 124.

The gurney wheels 136 and the fold-down handle 138 are each configured to move to retracted positions for storage and move to extended positions during use. As such, the user may easily pull the extended handle 138 to roll the wagon cart 124 around a worksite on the gurney wheels 136. However, when the user desires to store the wagon cart 124 within the storage housing 12, the user simply folds the gurney wheels 136 and the handle 138 to retracted positions. The storage housing 12 also includes a hinged cabinet door 144 for covering the storage drawers 118, 120, 122, 124 and inhibiting unauthorized access. As with the other features of the storage system 10, the specific size, arrangement, and layout of storage boxes and spaces within the storage housing 12 may be modified in other embodiments to fit the desires of an end user without departing from the scope of the invention.

In order to enhance protection of the tools and equipment stored within the storage housing 12 as shown in FIG. 1, the storage housing 12 also includes a plurality of locking mechanisms 146 to secure the central doors 13a, 13b, the cabinet doors 128, 144, and the housing drawers 110a, 110b in closed positions. The locking mechanisms 146 are more particularly in the form of a rotatable handle that engages the storage housing 12 to hold the central doors 13a, 13b, the cabinet doors 128, 144, and the housing drawers 110a, 110b against the remainder of the storage housing 12. The locking mechanisms 146 may also include an internal lock (not shown) configured to receive a key (not shown), or other form of entry validation, to open the locking mechanisms 146. However, it will be appreciated that alternative structures for securing the central doors 13a, 13b, the cabinet doors 128, 144, and the housing drawers 110a, 110b in closed positions may be similarly used.

Alternatively or in addition to the locking mechanisms 146, the storage system 10 may include a locking tarp (not shown) and a lock wire (not shown) for further inhibiting unauthorized access. For example, the storage housing 12 may include a plurality of U-shaped wire retention members (not shown) positioned about a lower portion of the storage housing 12. The locking tarp (not shown) may thus be placed over the storage housing 12 to cover the storage housing and the lock wire (not shown) may be securely connected to the locking tarp (not shown) and the wire retention members (not shown) to secure the locking tarp in place over the storage housing 12.

In any case, the storage system 10 provides a secure and convenient way to organize a set of tools and equipment in various fields, and this system 10 overcomes many of the drawbacks with conventional designs. Furthermore, the ease of organizing a set of tools and finding tools quickly when needed at a worksite is improved when using the tool cart 15. Moreover, the storage options are reconfigurable on the shelves 20, 22 of the tool cart 15, thereby providing added versatility and usefulness to the storage system 10.

While the present invention has been illustrated by the description of exemplary embodiments thereof, and while those embodiments have been described in considerable detail, it is not intended to restrict or in any way limit the scope of the appended claims to such detail. Additional advantages and modifications will readily appear to those skilled in the art. The present invention in its broader aspects is therefore not limited to the specific details, representative apparatus and method and illustrative examples shown and described. Accordingly, departures may be from such details without departing from the scope or spirit of the general inventive concept.

What is claimed is:

1. A mobile tool cart, comprising:
a frame mounted on at least one of a plurality of wheels and a plurality of feet;
a plurality of shelves coupled to and supported by the frame; and
at least two tool storage devices positioned on the plurality of shelves in such a manner so as to be reconfigurable in arrangement on the shelves, each of the tool storage devices further comprising:
an array of tubes open at at least one end thereof and being interconnected to each other such that each of the tubes is oriented generally vertically and directly connected at a vertically-extending external surface thereof to a vertically-extending external surface of at least one other tube in the array of tubes so as to define abutting contact with the at least one other tube, wherein at least one of the tubes in the array of tubes defines at least one of a different diameter or length than other tubes in the array of tubes, and wherein each of the tubes defines an elongated hollow storage space configured to receive a tool working device for access by a user.

2. The mobile tool cart of claim 1, wherein at least two of the tool storage devices are positioned on each of the shelves.

3. The mobile tool cart of claim 1, wherein the array of tubes in each of the tool storage devices includes tubes having varying diameter and varying length.

4. The mobile tool cart of claim 3, wherein each of the tubes in the array of tubes in each of the tool storage devices is connected at the vertically-extending external surface thereof to at least two other tubes in the array of tubes.

5. The mobile tool cart of claim 1, wherein the mobile tool cart defines a portion of a tool storage system, which also comprises:
a storage housing including at least one storage space accessible through a door, the storage housing including a lock mechanism associated with the door to prevent unauthorized access into the storage housing.

6. The mobile tool cart of claim 5, wherein the storage housing includes a plurality of storage spaces accessible through respective doors.

7. The mobile tool cart of claim 6, wherein at least one of the plurality of storage spaces includes at least one of a plurality of hooks and a plurality of drawers for storing tools and pieces of equipment separately from the mobile tool cart.

8. The mobile tool cart of claim 5, wherein the storage housing includes a wagon cart received therein, the wagon cart having a plurality of wheels moveable between a retracted position for storage and an extended position for use.

9. The mobile tool cart of claim 1, further comprising:
additional tool storage elements located on the plurality of shelves, the additional tool storage elements including at least one of:
storage boxes sized to receive one or more working devices; and
socket trays configured to receive at least one set of sockets, tool sets or tool bits,
wherein at least two of the tool storage devices are positioned on each of the shelves,
wherein the mobile tool cart further comprises at least one of the following:
storage drawers mounted for sliding movement relative to the frame and the plurality of shelves; and
extendible trays configured to move between a retracted position underneath one of the shelves and an extended position projecting from the shelf,
wherein the tool storage devices further comprise:
foam spacers inserted into the elongated hollow storage space of a plurality of the tubes in the array of tubes, the foam spacers modifying the storage space defined by the tubes by adjusting a depth of the elongated hollow storage spaces within the tubes.

10. The mobile tool cart of claim 9, wherein the array of tubes in each of the tool storage devices includes tubes having varying diameter and varying length.

11. The mobile tool cart of claim 10, wherein each of the tubes in the array of tubes in each of the tool storage devices is connected at the vertically-extending external surface thereof to at least two other tubes in the array of tubes.

12. A mobile tool cart, comprising:
a frame mounted on at least one of a plurality of wheels and a plurality of feet;
a plurality of shelves coupled to and supported by the frame;
at least two tool storage devices positioned on the plurality of shelves in such a manner so as to be reconfigurable in arrangement on the shelves, each of the tool storage devices further comprising:
an array of tubes open at at least one end thereof and being interconnected to each other such that each of the tubes is oriented generally vertically and connected at an external surface thereof to at least one other tube in the array of tubes, wherein at least one of the tubes in the array of tubes defines at least one of a different diameter or length than other tubes in the array of tubes, and wherein each of the tubes defines an elongated hollow storage space configured to receive a tool working device for access by a user; and
additional tool storage elements located on the plurality of shelves, the additional tool storage elements including at least one of:
storage boxes sized to receive one or more working devices; and
socket trays configured to receive at least one set of sockets, tool sets or tool bits,
wherein at least two of the tool storage devices are positioned on each of the shelves.

13. The mobile tool cart of claim 12, further comprising at least one of:
storage drawers mounted for sliding movement relative to the frame and the plurality of shelves; and
extendible trays configured to move between a retracted position underneath one of the shelves and an extended position projecting from the shelf.

14. The mobile tool cart of claim 13, further comprising:
at least one auxiliary tool holding plate coupled to the frame adjacent to a side edge of one of the plurality of shelves.

15. The mobile tool cart of claim 14, further comprising:
handles coupled to at least one of the frame and the plurality of shelves, the handles configured to be used to move the tool cart around a worksite.

16. A mobile tool cart, comprising:
a frame mounted on at least one of a plurality of wheels and a plurality of feet;

a plurality of shelves coupled to and supported by the frame;

at least two tool storage devices positioned on the plurality of shelves in such a manner so as to be reconfigurable in arrangement on the shelves, each of the tool storage devices further comprising:

an array of tubes open at at least one end thereof and being interconnected to each other such that each of the tubes is oriented generally vertically and connected at an external surface thereof to at least one other tube in the array of tubes, wherein at least one of the tubes in the array of tubes defines at least one of a different diameter or length than other tubes in the array of tubes, and wherein each of the tubes defines an elongated hollow storage space configured to receive a tool working device for access by a user, wherein the tool storage devices further comprise:

foam spacers inserted into the elongated hollow storage space of a plurality of the tubes in the array of tubes, the foam spacers modifying the storage space defined by the tubes by adjusting a depth of the elongated hollow storage spaces within the tubes.

* * * * *